3,086,995
PREPARATION OF FORMALDEHYDE
Carl E. Heath, Nixon, and William Bartok, Cranford, N.J., assignors to Esso Research and Engineering Company, a corporation of Delaware
No Drawing. Filed Dec. 30, 1959, Ser. No. 862,790
5 Claims. (Cl. 260—604)

This invention relates to an improved process for preparing formaldehyde. In particular this invention relates to a process for preparing formaldehyde directly from ethane by a novel vapor-phase oxidation technique. More particularly, this invention relates to a method for obtaining a high selectivity to formaldehyde in low temperature ethane oxidation by effecting such oxidation at a temperature in the range of 400° to 800° F. with a gas containing molecular oxygen and ozone in a reaction zone having a surface to volume ratio of above 2, preferably 3.5 to 5.8, cm.$^{-1}$. The term "cm.$^{-1}$" is used herein as it is conventionally employed in the literature to designate the ratio of square centimeters of surface/cubic centimeters of volume.

Formaldehyde is, of course, a well-known commercial chemical which finds utility in various fields. For example, it is known extensively as a reagent, preservative, antiseptic and as a component of many valuable commercial resins, e.g. phenol-formaldehyde, urea-formaldehyde, melamine-formaldehyde, etc.

Preparation of formaldehyde from ethane at very high temperatures, i.e. above 600° C. (1112° F.) in the presence of vitreous material is known in the art, e.g. U.S. Patent 1,729,711. For many reasons it is preferable to operate such a reaction at as low a temperature as possible which will still afford high selectivities to formaldehyde. Thus, feed losses to excessive decomposition can be minimized and temperature control is more easily maintained.

It has now been discovered that formaldehyde can be prepared directly from ethane at temperatures in the range of 400° to 800° F. with unexpectedly high selectivities under certain critical conditions.

The reaction may be carried out in conventional reaction equipment having a high surface to volume ratio in the range of above about 2, preferably about 3.5 to 5.8, cm.$^{-1}$. The particular form of the reactor is not critical. For example, a very simple type of reactor would comprise an open tube which is maintained, by external heat exchange, at the desired temperature level. In addition to external heat exchange, an inert gas diluent is employed to aid in temperature control. Gases such as $N_2$, $CO_2$ and the like are suitable. The total oxidizing gas mixture should include in addition to oxygen and ozone about 50 to 95 volume percent of such inert gas. The reactant ethane, the oxygen and ozone are then simply passed through the tube at a predetermined space velocity. The gaseous reaction product mixture is then condensed to form a liquid mixture of oxygenated products which is separated into its component parts. There are, however, more complex oxidation reactors which are amenable to this process. Those skilled in the art will realize that various modifications in reactor design may be made wherein single or multiple reaction zones, packed or unpacked chambers employing single or multiple reactant inlets may be advantageously employed within the scope of this invention so long as the surface to volume ratios hereinbefore set forth are met. The preferred surfaces are metal oxides such as PbO, $B_2O_3$, $MnO_2$, etc. Conventional stainless steel reactor metal may also be used. The term "stainless steel" is used herein to designate non-corrosive chromium-nickel alloy steels. Preferably such steels have combined therein about 10–20 wt. percent chromium, 5 to 15 wt. percent nickel in addition to the normal steel components of iron and small amounts, i.e. up to 1.75 wt. percent, carbon. Minor amounts of other metals such as manganese and molybdenum may also be combined in such steels. One such steel commonly used for this purpose is known as "type 316 stainless steel" and has the following wt. percent composition: chromium 16–18, nickel 10–14, molybdenum 1.75–2.75, and carbon 0.1 maximum with iron comprising the balance. Other non-corrosive metals of groups VI, VII and VIII of the periodic table, as reported by the Commission of the International Union of Chemistry, 1949, may be used but the aforementioned metal oxides, and particularly PbO, are preferred as they afford high selectivities at lower temperatures.

Although formaldehyde may be produced over a wide range of temperatures, the temperature range at which ethane can be converted with a high selectivity to formaldehyde without undue loss of feed to decomposition, e.g. $CO_2$, is quite critical, a fact that is demonstrated hereinafter in the operating examples. Thus, the temperature should be maintained in the range of about 400° to 800° F., advantageously between about 450° to 750° F., and preferably between 450° and 600° F. Pressures in the range of 1 to 50, preferably 1 to 10, atmospheres may be used.

Another factor governing the conditions employed is the degree of conversion desired. With simple oxidation reactors where the temperature is difficult to control, it is advisable to maintain the conversion level rather low in order to avoid runaway temperatures. On the other hand, where more advanced oxidation reactors are used wherein good control of temperatures is possible, higher conversions may be obtained. The mole ratio of $O_2$ to ethane is preferably maintained between 0.2 to 1.0, preferably about 0.3 to 0.5. Ozone must be employed to effect the desired conversion of ethane to formaldehyde. Amounts in the range of about 0.5 to 5 volume percent based on oxygen may be employed. To obtain high selectivities to formaldehyde the ozone concentration in the reaction zone should be made in the range of 0.5 to 2.5, preferably 0.5 to 1.0, wt. percent based on ethane present.

The specific feed rates, contact time, oxygen partial pressure and other conditions may vary somewhat according to the efficiency of the reactor employed.

The optimum contact time for this vapor phase reaction will vary according to the temperature, pressure and the oxidant employed. For the simple open tube type reactor wherein the conversion is maintained at a low level, a contact time between 0.5 to 4 seconds is preferred. The conversion level is relatively unimportant since the off-gases may be recycled to the reactor after condensation of the oxy products. CO and $CO_2$ may be removed from the off-gases by absorption in diethanolamine solutions, etc. Unreacted oxygen and ethane may be recycled to the reactor where ozone may be added.

The preferred hydrocarbon feedstock is essentially pure ethane. However, a $C_1$–$C_4$ hydrocarbon stream containing a major amount of ethane may be satisfactorily employed. In carrying out the process of this invention both the oxidizing gas and the ethane are preferably preheated to the desired temperature of reaction or slightly below and brought into contact with each other in a reaction zone maintained at the desired temperature of reaction. The ethane and oxidizing gas may be premixed and introduced into the reaction zone as a single stream or each may be introduced into the reaction zone separately.

The oxygenated products formed may be separated from unreacted ethane by scrubbing with water or other conventional aqueous wash solutions or mixtures. Formaldehyde may then be separated from the gross oxygenated product by conventional distillation techniques and other conventional methods of separation.

The following examples demonstrate the criticality of the conditions hereinbefore described. Conversion was deliberately maintained at a relatively low level, i.e. 5–10%, in order to avoid runaway temperature with a simple type of reactor.

EXAMPLE 1

A mixture of air containing $O_3$ and ethane, in an $O_2/C_2H_6$ mole ratio of 0.4 is preheated and passed through a steel tube the interior surfaces of which had been coated with PbO. The coating is applied by washing the reaction zone surfaces with a 10% $Pb(NO_3)_2$ solution, drying at 250° F. for 3 hours followed by baking at 1500° F. for 12 hours. The surface to volume ratio of the reaction zone is about 3.0 cm.$^{-1}$. The reaction zone is maintained at a temperature of about 500° F. The 26 inch reaction tube employed has an internal diameter of about ¾ inch. A thermowell providing a like surface and having an external diameter of ¼ inch is positioned within the reaction zone. The concentration of ozone in the reaction zone based on weight of ethane present is maintained at about 0.9 wt. percent. Contact time is about 2 seconds. The reaction product containing effluent is passed from the reactor to a condenser wherein liquid product is formed. The oxygenated product is washed with water containing about 0.1 wt. percent hydroquinone, separated and analyzed.

Analysis of the total oxygenated product reveals the selectivity to the various components thereof in terms of wt. percent on ethane converted to be as follows:

| | |
|---|---|
| Formaldehyde | 85.91 |
| Acetaldehyde | 15.40 |
| Formic acid | 5.39 |
| Acetic acid | 2.97 |
| Peroxide (as $C_2H_5OOH$) | .33 |

An oxidation of ethane is carried out as in the first run except that the lining of the reaction zone is quartz. Analysis of the oxygenated product reveals a drop in selectivity to formaldehyde of more than 30%.

EXAMPLE 2

An oxidation of ethane is carried out as in Example 1 except that the interior surfaces of the reaction zone are coated with $B_2O_3$.

Analysis of the gross oxygenated product reveals a selectivity to formaldehyde (based on converted ethane) of about 81.95 weight percent.

EXAMPLE 3

Other runs are made as in the preceding examples at a constant temperature, i.e. 500° F., with chromium-nickel alloy steel tubes (Type 316—composition hereinbefore set forth) forming the reaction zone. An $O_2/C_2H_6$ mole ratio of 0.4 is employed. The concentration of ozone in the reaction zone based on weight of ethane present is maintained at about 0.9 weight percent. Contact time is about 2 seconds.

The gross oxygenated product is recovered as before and analyzed. The selectivities to formaldehyde, based on weight of ethane converted, at different surface to volume ratios are as follows:

*Selectivities to Formaldehyde at 500° F.*

| S/V, cm.$^{-1}$ | 0.8 | 4.9 |
|---|---|---|
| Selectivity to Formaldehyde, weight percent | 65 | 84 |

Additional runs are made under the same conditions except that surface to volume ratio in the reaction zone is held constant, i.e. at 30 cm.$^{-1}$, and the temperature varied. The gross oxygenated product is recovered as before and analyzed. The selectivities to formaldehyde, based on weight of ethane converted, at different temperatures are as follows:

*Selectivities to Formaldehyde at Constant Surface to Volume Ratio*

| Temperature, ° F. | 300 | 800 |
|---|---|---|
| Selectivity to Formaldehyde, wt. percent | 19 | 90 |

At intermediate temperatures intermediate selectivities are obtained. However, in the preferred temperature range, i.e. 450° to 600° F., the selectivity to formaldehyde with steel at 3.0 cm.$^{-1}$ is considerably below, e.g. 15 to 25%, selectivities obtainable with metal oxide surfaces, e.g. PbO, at equivalent temperatures.

EXAMPLE 4

An oxidation of ethane is carried out as in Example 1 except that the PbO lined reaction zone has a surface to volume ratio of about 5 cm.$^{-1}$ and a temperature of 600° F. is employed. Analysis of gross oxygenated product reveals a selectivity to formaldehyde (based on converted ethane) of above 90 weight percent.

EXAMPLE 5

An oxidation of ethane is carried out as in Example 4 except that in separate runs the concentration of ozone based on weight of ethane present is first lowered to about 0.3 weight percent and raised to about 2.8 weight percent. In each run the selectivity to formaldehyde is materially decreased.

EXAMPLE 6

An advantage of obtaining high selectivities to formaldehyde at low temperatures is demonstrated by examination of reactor off-gas for CO and $CO_2$. Analysis is made during runs at 300°, 500°, and 700° F. using a stainless steel reaction tube.

The contents of these decomposition gases measured in volume percent of total gaseous effluent from the reactor are found to be as follows:

| Temperature, ° F. | 300 | 500 | 700 |
|---|---|---|---|
| CO, Vol. percent | 0.41 | 0.80 | 1.80 |
| $CO_2$, Vol. Percent | 0.22 | 0.40 | 0.45 |
| Total $CO+CO_2$, Vol. Percent | 0.63 | 1.20 | 2.25 |

This demonstrates the particular advantage of employing a metal oxide surface, particularly PbO, in the reaction zone in that they afford extremely high selectivities to formaldehyde at temperatures of 500° F. and below.

EXAMPLE 7

An oxidation of ethane is carried out as in Example 1 except that an $O_2$ to ethane mole ratio of 0.8 is employed. The selectivity to formaldehyde in the oxygenated product is not substantially below that obtained in Example 1.

What is claimed is:

1. A process for producing formaldehyde which comprises contacting ethane and molecular oxygen in an oxygen to ethane mole ratio of about 0.2 to 1 with 0.5 to 2.5 weight percent ozone based on ethane in a reaction zone having a surface to volume ratio of about 2 to 5.8 cm.$^{-1}$ at a temperature in the range of 400–800° F., said surface being selected from the group consisting of oxides of lead, boron and manganese, and withdrawing reaction product from the reaction zone and recovering formaldehyde therefrom.

2. A process for producing formaldehyde which comprises passing ethane and molecular oxygen in an oxygen to ethane mole ratio of about 0.2 to 1, with 0.5 to 2.5 weight percent ozone based on ethane at a temperature in the range of 450 to 750° F. through a reaction zone having a surface to volume ratio of 2 to 5.8 cm.$^{-1}$, said surface being selected from the group consisting of oxides of lead, boron and manganese, withdrawing reaction product from said reaction zone and recovering formaldehyde therefrom.

3. A process in accordance with claim 2 wherein said surface is a lead oxide surface.

4. A process for producing formaldehyde which comprises contacting ethane in a gas mixture containing 50–95 volume percent of inert gas and 5–50 volume percent of an oxidant containing 95–99 volume percent molecular oxygen and 1–5 volume percent ozone at about 400–750° F. for about 0.5 to 4 seconds in an open tube reactor having a surface to volume ratio of about 4–5.5 cm.$^{-1}$, said surface being selected from the group consisting of oxides of lead, boron, and manganese, withdrawing reaction product from said reaction zone and recovering formaldehyde therefrom.

5. A process in accordance with claim 4 wherein said surface is a lead oxide surface.

References Cited in the file of this patent

UNITED STATES PATENTS

| | | |
|---|---|---|
| 1,423,753 | Carter et al. | July 25, 1922 |
| 2,775,601 | Gardner et al. | Dec. 25, 1956 |
| 2,974,173 | Long et al. | Mar. 7, 1961 |